(12) United States Patent
Thinn et al.

(10) Patent No.: US 9,010,947 B1
(45) Date of Patent: Apr. 21, 2015

(54) MIRROR WITH REPLACEABLE FILM REFLECTOR

(76) Inventors: Joseph Thinn, Costa Mesa, CA (US); Mark M. Conn, Tarzana, CA (US)

( * ) Notice: Subject to any disclaimer, the term of this patent is extended or adjusted under 35 U.S.C. 154(b) by 114 days.

(21) Appl. No.: 13/282,711

(22) Filed: Oct. 27, 2011

Related U.S. Application Data

(60) Provisional application No. 61/407,673, filed on Oct. 28, 2010.

(51) Int. Cl.
*G02B 5/08* (2006.01)

(52) U.S. Cl.
CPC .......................................... *G02B 5/08* (2013.01)

(58) Field of Classification Search
CPC ................... G02B 7/182; G02B 5/08–5/0866
USPC ............... 312/1, 34.1, 35, 42, 109, 114, 128, 312/183–192, 224–227, 325; 248/466, 468, 248/473, 476–478, 488–491; 359/846, 849, 359/870, 871, 883; 49/246
See application file for complete search history.

(56) References Cited

U.S. PATENT DOCUMENTS

| | | | |
|---|---|---|---|
| 1,060,447 A | 4/1913 | Geisler | |
| 1,779,845 A * | 10/1930 | Harring | 49/246 |
| 1,979,081 A | 10/1934 | Schott | |
| 2,029,221 A | 1/1936 | Burgess et al. | |
| 3,180,220 A | 4/1965 | Jeffree | |
| 3,552,835 A | 1/1971 | Benzies | |
| 3,687,524 A * | 8/1972 | Martinez | 359/847 |
| 4,337,590 A | 7/1982 | Jackson | |
| 5,222,000 A | 6/1993 | Adler | |
| 5,671,097 A * | 9/1997 | Merriweather, Jr. | 359/871 |
| 6,532,119 B1 * | 3/2003 | Martinez, Sr. | 359/884 |
| 7,374,301 B1 * | 5/2008 | Simmers | 359/847 |
| 2008/0247069 A1 * | 10/2008 | Bronstein | 359/871 |

* cited by examiner

*Primary Examiner* — Stephone B Allen
*Assistant Examiner* — James McGee
(74) *Attorney, Agent, or Firm* — Kenneth L. Green

(57) ABSTRACT

A wall mountable mirror includes an enclosure and a replaceable film sheet allowing easy repair to commercial bathroom mirrors following vandalism. The enclosure includes a backing frame and a face frame. The backing frame is mounted to a wall and the face frame is connected to the backing frame by two pairs of parallel links. A top link pair is preferably longer than a bottom link pair. The film sheet includes small edge rods attached along each edge. The face is pulled out and down to open the enclosure to replace the film sheet. When the face is closed, the last closing motion provided by the links is a parallel motion which uniformly stretches the film sheet by pushing the edge rods over corresponding curved tensioning members to stretch the film sheet providing uniform stretching in two dimensions to provide a flat reflecting surface.

18 Claims, 4 Drawing Sheets

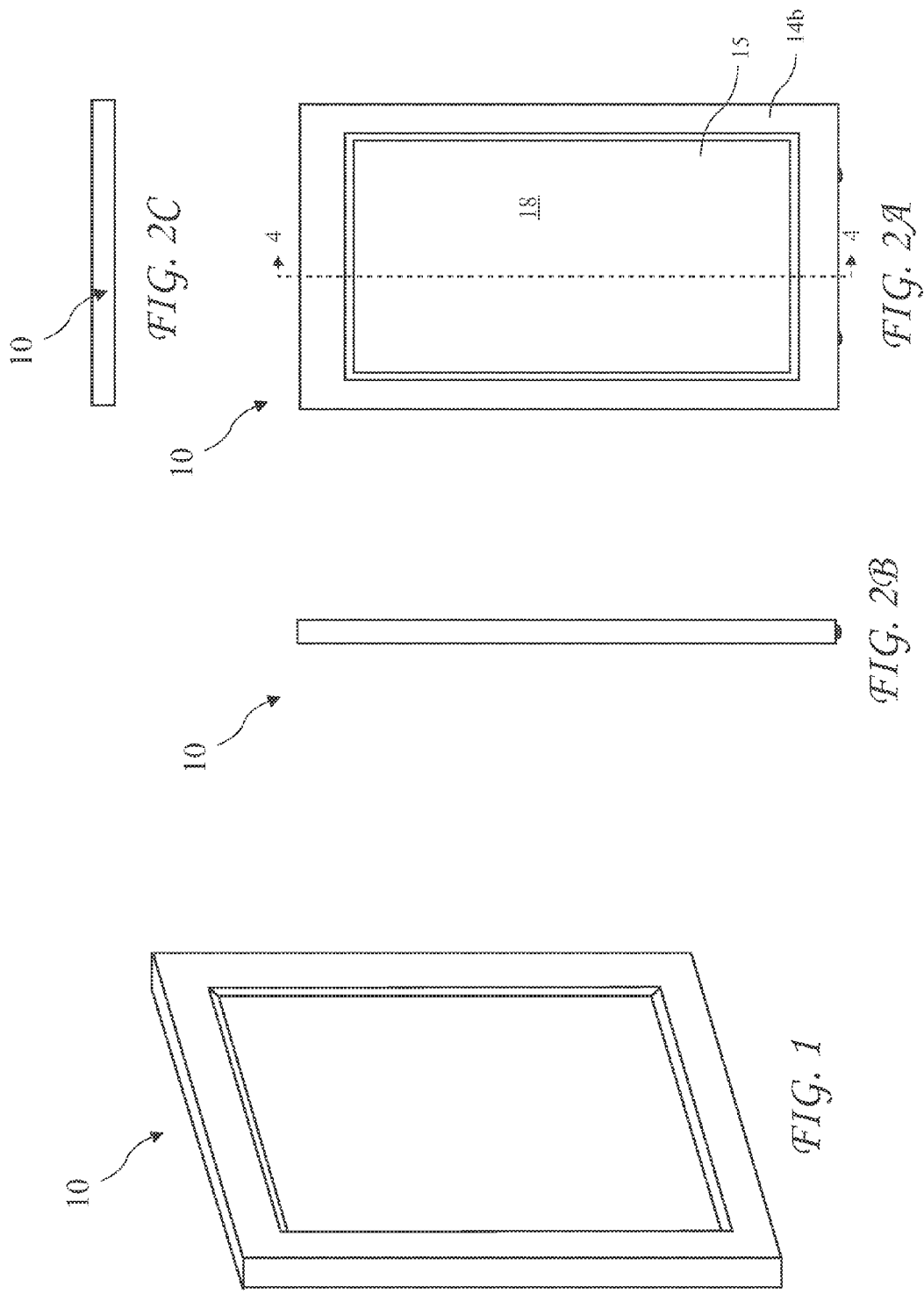

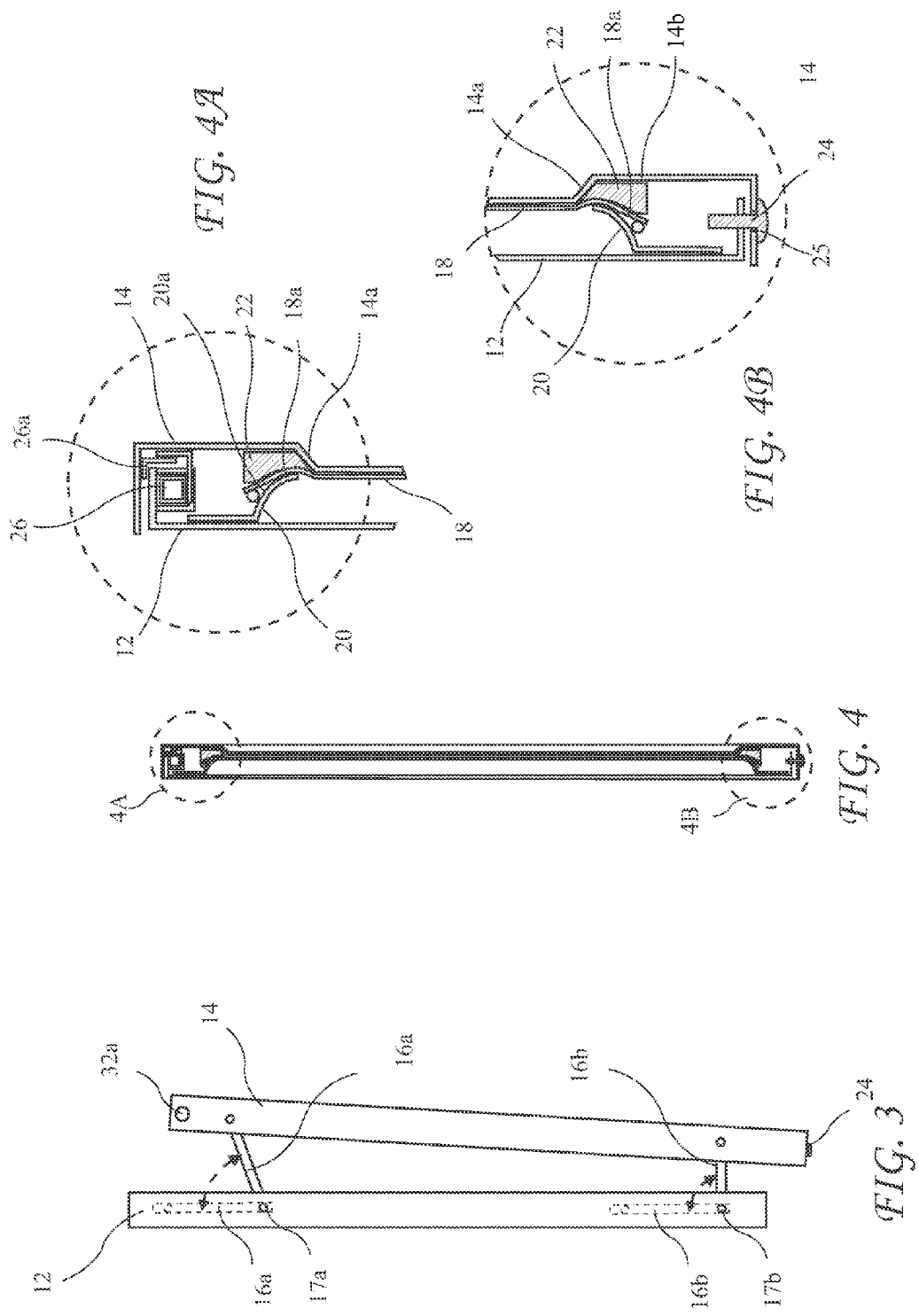

MIRROR WITH REPLACEABLE FILM REFLECTOR

The present application claims the priority of U.S. Provisional Patent Application Ser. No. 61/407,673 filed Oct. 28, 2010, which application is incorporated in its entirety herein by reference.

BACKGROUND OF THE INVENTION

The present invention relates to mirrors and in particular to a commercial bathroom mirror with a replaceable film sheet for simple and low cost repair.

Mirror assemblies in bathrooms in commercial locations, such as restaurants, are often vandalized. When glass mirrors of the mirror assembly are damaged, the entire mirror assembly must generally be replaced at substantial cost. In many locations, mirror assemblies have been removed from restrooms due to the frequent vandalism.

BRIEF SUMMARY OF THE INVENTION

The present invention addresses the above and other needs by providing a wall mountable mirror which includes an enclosure and a replaceable refill sheet allowing easy repair to commercial bathroom mirrors following vandalism. The enclosure includes a backing frame and a face frame. The backing frame is mounted to a wall and the face frame is connected to the backing frame by two pairs of parallel links. A top link pair is preferably longer than a bottom link pair. The refill sheet includes small edge rods attached along each edge. The face frame is pulled out and down to open the enclosure to replace the refill sheet. When the face frame is closed, the last closing motion provided by the links is a parallel motion which uniformly stretches the refill sheet by pushing the edge rods over corresponding curved tensioning members to stretch the refill sheet providing uniform stretching in two dimensions to provide a flat reflecting surface

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 is a perspective view of a mirror with replaceable refill sheet reflector according to the present invention.

FIG. 2A is a front view of the mirror with replaceable refill sheet reflector according to the present invention.

FIG. 2B is a side view of the mirror with replaceable refill sheet reflector according to the present invention.

FIG. 2C is a top view of the mirror with replaceable refill sheet reflector according to the present invention.

FIG. 3 is a side view of the mirror with replaceable refill sheet reflector according to the present invention with an opened face frame.

FIG. 4 is a cross-sectional side view of the mirror with replaceable refill sheet reflector according to the present invention taken along line 4-4 of FIG. 2A.

FIG. 4A is a cross-sectional side view of detail 4A of FIG. 4 of the mirror with replaceable refill sheet reflector according to the present invention.

FIG. 4B is a cross-sectional side view of detail 4B of FIG. 4 of the mirror with replaceable refill sheet reflector according to the present invention.

Corresponding reference characters indicate corresponding components throughout the several views of the drawings.

DETAILED DESCRIPTION OF THE INVENTION

Figure 5:
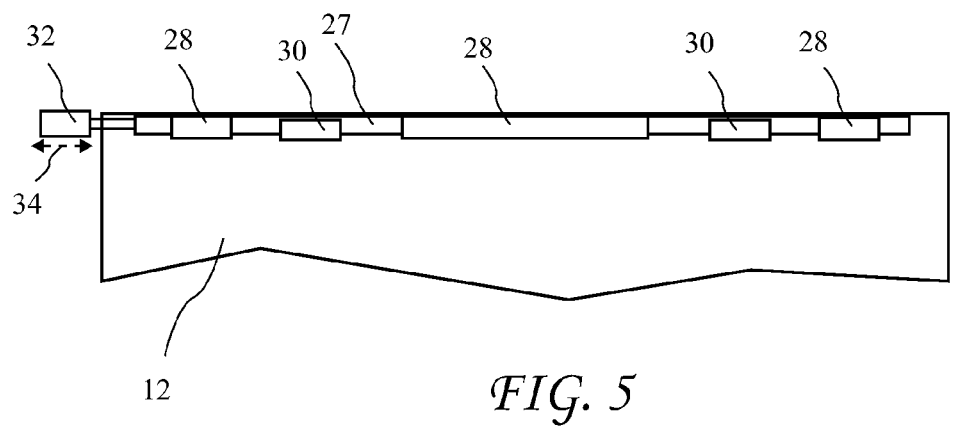
FIG. 5 shown a sliding locking system of the mirror with replaceable refill sheet reflector according to the present invention.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A perspective view of a mirror 10 with replaceable refill sheet reflector according to the present invention is shown in FIG. 1, a front view of the mirror 10 is shown in FIG. 2A, a side view of the mirror 10 is shown in FIG. 2B, and a top view of the mirror 10 is shown in FIG. 2C. The mirror 10 is wall mountable and particularly suitable for use in restrooms in commercial locations where vandalism is common. The mirror 10 includes a face frame having a window 15 exposing a refill sheet 18 and a window frame 14b around the window 15.

A side view of the mirror 10 with an opened face frame 14 is shown in FIG. 3. The face frame 14 is attached to a fixed (e.g., attached to a wall) backing frame 12 by pivoting upper arms 16a and lower arms 16b. The upper arms 16a are preferably longer than the lower arms 16b to provide a preferred closing movement of the face frame 14. For example, the upper arms 16a may be about 5.7 inches long and the lower arms 16b may be about 1.6 inches long. A key passage 32a in the face frame allows a key 32 (see FIG. 5) to be inserted through the face frame 14 to engage and disengage a sliding lock 26 (see FIG. 4A) at the top of the mirror 10. When engaged, the sliding lock 26 holds the face frame 14 against the backing frame 12, thereby holding a refill sheet 18 in tension to provide a smooth reflective surface very similar to a glass mirror. The upper arms 16a have a first generally vertical position shown in dashed lines and pivot around a fixed pivot 17a in the backing frame 12 to a second non-generally vertical position shown in solid lines, and the lower arms 16b have a first generally vertical position shown in dashed lines and pivot around a fixed pivot 17b in the backing frame 12 to a second non-generally vertical position shown in solid lines.

A cross-sectional side view of the mirror 10 taken along line 4-4 of FIG. 2A is shown in FIG. 4, a cross-sectional side view of detail 4A of FIG. 4 of the mirror 10 is shown in FIG. 4A, and a cross-sectional side view of detail 4B of FIG. 4 of the mirror 10 is shown in FIG. 4B. Tensioning members 20 are attached to the backing frame 12 near the perimeter of the backing frame 12. The tensioning member 20 include an arced forward facing surface 20a reaching out from the backing frame 12 towards the face frame 14 curving and then inward under edges 18a of the refill sheet 18. The refill sheet 18 is sandwiched between the surface 20a and a compressible material 22 attached to an inward facing surface of the face frame 14, preferably concealed outside an inward angled edge 14a surrounding the viewable portion of the refill sheet 18. The refill sheet 18 preferably includes rods (or dowel rods) 36 (see FIGS. 6A and 6B) attached to four sides of a film sheet 39 of the refill sheet 18. A round rod is preferred, but rods with other cross-sections, for example, oval, elliptical, square, hexagonal, octagonal, and the like may also be used.

The sliding lock 26 resides at the top of the mirror 10 and locks the face frame 14 in the closed position. Pins 24 at the bottom of the mirror 10 are fixed to the bottom of the face frame 14 and enter passages 25 in corresponding positions at the bottom of the backing frame 12 to further position the closed face frame 14 on the backing frame 12.

The sliding lock 26 is shown in FIG. 5. The sliding lock 26 comprises a sliding bar 27, guides 28, and catches 30. The catches 30 cooperate with angles 26a attached to the horizontal top edge of the backing from 12 to hold the face frame 14 in the closed position. A key 32 is inserted through the key passage 32a (see FIG. 3) and engages the sliding bar 27 to engage and disengage the sliding lock 26.

Figures 6A, 6B:
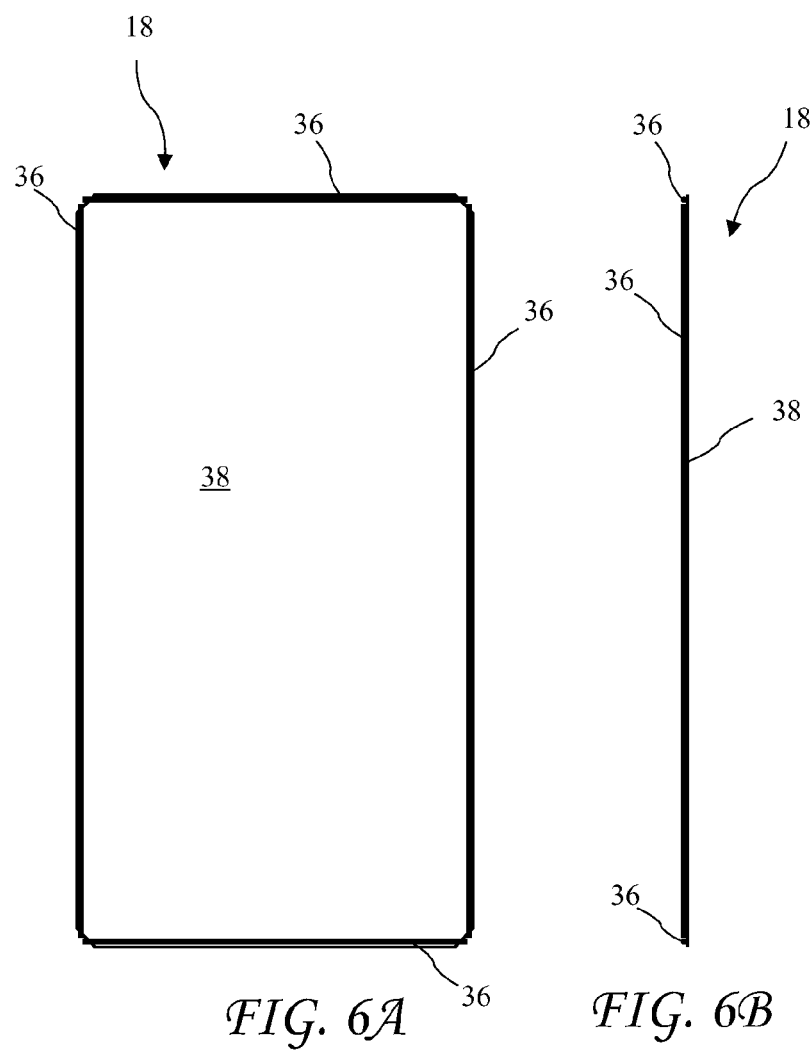
FIG. 6A shows a front view of a refill sheet suitable for use with the mirror with replaceable refill sheet reflector according to the present invention.
FIG. 6B shows a side view of the refill sheet suitable for use with the mirror with replaceable refill sheet reflector according to the present invention.

A front view of a refill sheet 18 suitable for use with the mirror 10 is shown in FIG. 6A and a side view of the refill sheet 18 is shown in FIG. 6B. The refill sheet 18 comprises a film sheet 38 and preferably includes rods 36 attached to the edges of the film sheet 38. The rods 36 cooperate with the tensioning member 20 and compressible material 22 to stretch the film sheet 38 into a flat reflective surface. The rods 38 may be taped or glued to the film sheet 38. While including the rods 36 is preferred, a film sheet with no rods, with thick edges, spaced apart tabs, or any structure to facilitate placing the film sheet in tension then the mirror frame is closed, may alternatively be used, and such structure and use is intended to come with the scope of the present invention.

The rods 36 may conveniently be attached to the film sheet 18 using a tilting hinged assembly fixture having a flat surface with a dog-stop at one end. The tilting hinged fixture has a foam material cavity that surrounds the dowels. The foam material holds and prevents the dowels from falling out of the fixture as the tilting hinged fixture is rotated 180 degrees. The rods 36 are attached to the film sheet 18 using the following steps:

positioning tape sticky side up longitudinally across the tilt fixture;

raising the film sheet front edge prior to rolling the tape over the tilt fixture;

gently rolling back the film sheet front edge on top of the sticky surface of the tape wherein the film sheet is positioned outboard of the hinged tilt fixture, and the remaining sticky tape (not occupied by the now adhered film sheet), is located on the hinged fixture is used to adhere the dowel to the tape;

inserting the rod longitudinally on top of the remaining sticky tape surface, wherein positioning the rod at a repeatable location on top of the flat surface is performed by way of an end stop/positioning dog wherein the flat surface allows for an even adhesion to the sticky part of the tape by the dowel/rod; and once the tilting hinge fixture with the trapped rod is rolled over unto the film sheet surface, placing the rod over (positioned by the tilt fixture) a slight cavity at the just formed edge of the now folded film sheet, wherein the slightly raised foam now presses the rod firmly into the slight cavity, and when the rod is pressed down, the remaining leading edge of the film sheet/sticky tape is rolled over unto the film sheet surface forming a flat non scalloped edge.

The operation is repeated until all four sides of the film sheet are now framed and positioned by the dowels rolled unto the film sheet. The precision of the film sheet framed position of the dowels allows for: proper alignment of the film sheet onto locating pins in the clam-shell back; for ease of removing damaged mirrors and placing new mirrors by an unskilled operator; the proper positioning of the mirror unto the open clam-shell; the ability to create a flat non optically distorted mirror surface. The flat surface is made possible by the proper position and repeatability of the tensional material inside the open clam-shell to locate and press onto the dowel thereby evenly stretching the film sheet into a perfectly even and optically correct surface.

Figure 8:
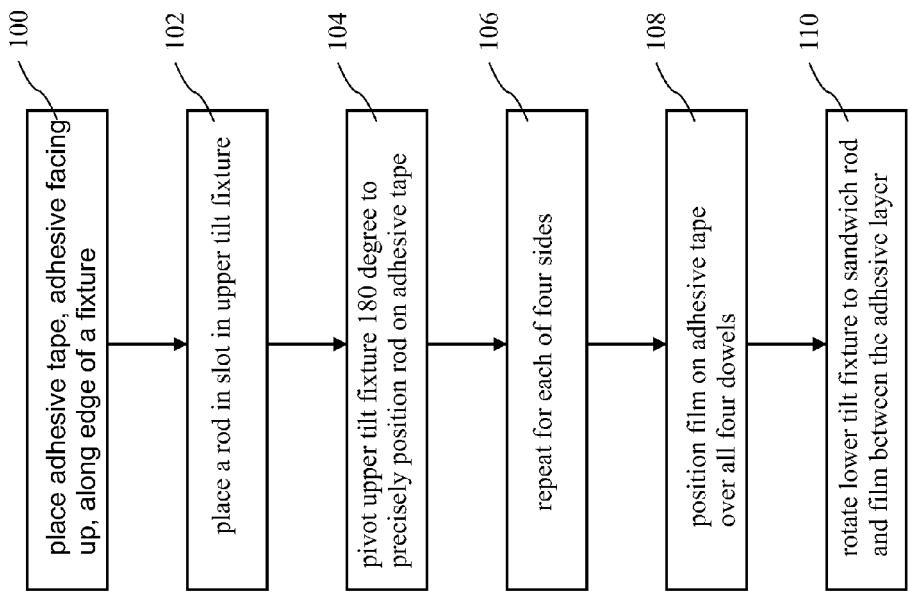
FIG. 8 shows a method for the production of the refill sheet positioning a rod in the fixture.
Figure 7A:
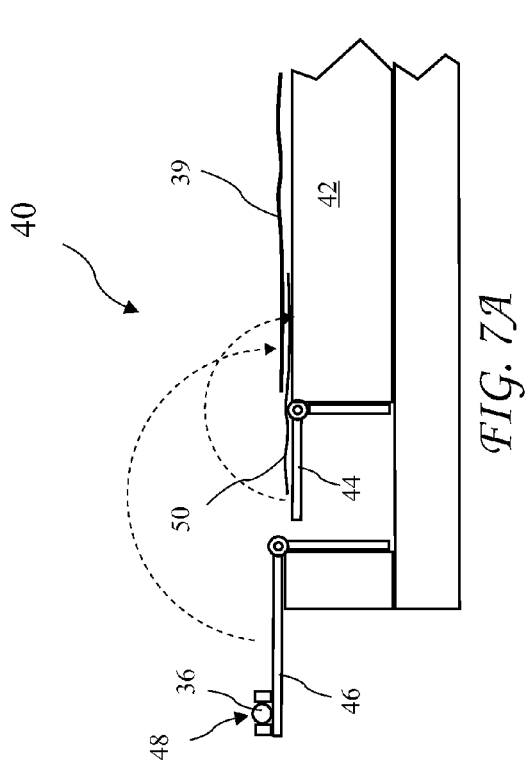
FIG. 7A shows a fixture used in the production of the refill sheet according to the present invention before forming an edge of the refill sheet.
Figure 7B:
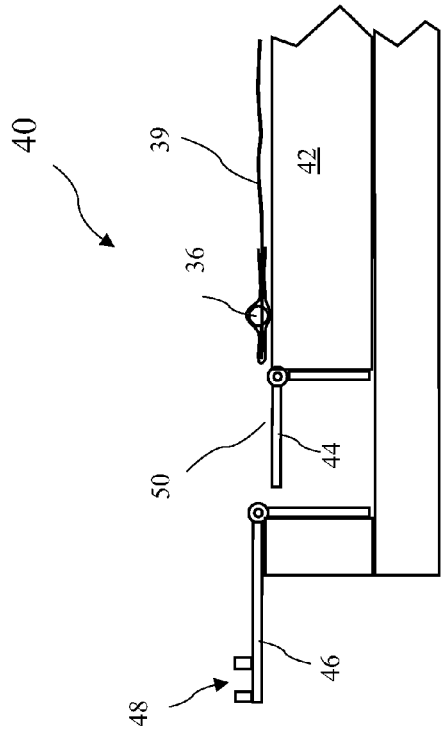
FIG. 7B shows the fixture with a formed edge of the refill sheet according to the present invention formed.

A fixture 40 used in the production of the refill sheet according to the present invention before forming an edge of the refill sheet is shown in FIG. 7A and after forming an edge of the refill in FIG. 7B, and a method for the production of the refill sheet according to the present invention is shown in FIG. 8. The fixture 40 includes a lower tilt fixture 44 and a upper tilt fixture 46. A slot 48 is provided on the upper tilt fixture 46 for positioning the rod 36. Adhesive tape 50 is shown resting, adhesive face up, along the edge of the fixture 40 and the rod 36 is shown positioned in the slot 48 in FIG. 7A. The steps for making the refill sheet 18 are: placing the adhesive tape, adhesive facing up, along edge of an edge of the fixture at step 100; placing a rod in slot in upper tilt fixture at step 102; pivot upper tilt fixture 180 degree to precisely position rod on adhesive tape at step 104; repeating for all four sides at step 106; position film on adhesive tape over all four dowels at step 108, and rotate lower tilt fixture to sandwich rod and film between the adhesive layer at step 110.

Various reflective thin film sheets may be suitable for use as the film sheet 38. Examples of a suitable film sheet 38 is a polyester film sheet a biaxially-oriented polyethylene terephthalate (boPET) film sheet, or a polyethylene terephthalate (PET), and a specific example of a suitable film sheet 38 is Mylar® film.

While the mirror according to the present invention is described using the refill sheet 18, in other embodiments the film sheet may be carried on a roll residing on one edge of the mirror, and mirrors using such roll are intended to come within the scope of the present invention.

While the invention herein disclosed has been described by means of specific embodiments and applications thereof, numerous modifications and variations could be made thereto by those skilled in the art without departing from the scope of the invention set forth in the claims.

We claim:

1. A wall mountable mirror comprising:
an enclosure having a wall mountable backing frame and a face frame having an opening, the face frame attached to the backing frame by an upper arm pair and a lower arm pair, the upper arm pair and lower arm pair pivotally attached to the backing frame at a backing frame end and pivotally attached to the face frame at a face frame end opposite the backing frame end, the face frame separable from the backing frame by pulling the face frame out and down from the backing frame, wherein the face frame has a first position residing against the backing frame wherein the upper arm pair and the lower arm pair are generally vertical, and a second position pulled away from the backing frame and the upper arm pair and the lower arm pair have pivoted clockwise around fixed pivots at the backing frame end, wherein the upper arm pair and the lower arm pair are no longer generally vertical; and a refill sheet held between the face frame and the backing frame, the refill sheet larger than the opening in the face frame and including a reflective film sheet.

2. The mirror of claim 1, wherein the upper arm pair is longer than the lower pair.

3. The mirror of claim 1, wherein the backing frame includes forward facing tensioning surfaces reaching out from the backing frame towards the face frame and then curving inward under edges of the refill sheet and outlining the opening in the face frame, and the refill sheet is stretched over the tensioning surfaces to provide a flat reflecting surface.

4. The mirror of claim 3, wherein:
a compressible material is attached to the face frame, the compressible material facing the tensioning surfaces; and
edges of the refill sheet are sandwiched between the tensioning surfaces and the compressible material.

5. The mirror of claim 4, wherein rods along each edge of the refill sheet are pushed towards the backing frame tensioning the refill sheet over the tensioning surfaces by cooperation of the compressible material and the tensioning surfaces.

6. The mirror of claim 3, wherein the refill sheet includes rods along each edge to cooperate with the tensioning surfaces to provide a flat reflecting surface.

7. The mirror of claim 6, wherein the reflective film sheet is a thin film sheet.

8. The mirror of claim 6, wherein the reflective film sheet is a polyester film sheet.

9. The mirror of claim 6, wherein the reflective film sheet is a biaxially-oriented polyethylene terephthalate (boPET) film sheet.

10. The mirror of claim 6, wherein the reflective film sheet is a polyester film made from stretched polyethylene terephthalate (PET).

11. A wall mountable mirror comprising:
an enclosure having a wall mountable backing frame;
a face frame having an opening;
a refill sheet larger than the opening in the face frame and including a reflective film sheet;
an upper arm pair and a lower arm pair attaching the face frame to the backing frame, the upper arm pair and the lower arm pair pivotally attached to the backing frame at a backing frame end and pivotally attached to the face frame at a face frame end opposite the backing frame end;
the face frame separable from the backing frame by pulling the face frame out and down from the backing frame, wherein the face frame has a first position residing against the backing frame wherein the upper arm pair and the lower arm pair are generally vertical, and a second position pulled away from the backing frame and the upper arm pair and the lower arm pair have pivoted clockwise around fixed pivots at the backing frame end, wherein the upper arm pair and the lower arm pair are no longer generally vertical;
the backing frame including forward facing curved tensioning surfaces reaching out from the backing frame towards the face frame and then curving inward under edges of the refill sheet and outlining the opening in the face frame;
a compressible material attached to the face frame, the compressible material facing the tensioning surfaces; and edges of the refill sheet sandwiched between the tensioning surfaces and the compressible material placing the refill sheet in tension over the tensioning surfaces to provide a flat reflecting surface.

12. A wall mountable mirror comprising:
an enclosure comprising a wall mountable backing frame and a face frame;
the face frame residing over the backing frame and having an open window and a window frame around the window;
a refill sheet larger than the window in the face frame and comprising a reflective film sheet;
tensioning surfaces attached to the enclosure and residing diagonally between a front surface of the backing frame and behind the window frame of the face frame;
a compressible material fixedly attached to the enclosure between a rear surface of the window frame of the face frame and the front surface of the backing frame, the compressible material facing the tensioning surfaces; and
edges of the refill sheet sandwiched between the tensioning surfaces and the compressible material, the compressible material compressed and exerting force on the edges of the refill sheet holding the refill sheet in tension,
wherein the face frame is attached to the backing frame by an upper arm pair and a lower arm pair, the upper arm pair and the lower arm pair allowing the face frame to be pulled away from the backing frame a fixed distance established by lengths of the upper arm pair and the lower arm pair without detaching the upper arm pair and the lower arm pair from the backing frame or from the face frame.

13. The wall mountable mirror of claim 12, wherein:
tensioning surfaces are attached to the front surface of the backing frame and reach towards the window frame and inward from the backing frame towards the face frame window; and
the compressible material fixedly attached to the rear surface of the window frame of the face frame, the compressible material facing the tensioning surfaces.

14. The wall mountable mirror of claim 12, wherein rods along each edge of the refill sheet are pushed towards the backing frame tensioning the refill sheet over the tensioning surfaces by cooperation of the compressible material and the tensioning surfaces.

15. The wall mountable mirror of claim 12, wherein the upper arm pair is longer than the lower arm pair and in an open position, the upper arm pair holds a top of the face frame farther away from the backing frame than lower arm pair holds a bottom of the face frame away from the backing frame.

16. The wall mountable mirror of claim 15, wherein pins at a mirror bottom of the wall mountable mirror are fixed to a face frame bottom of the face frame and enter passages in corresponding positions at the bottom of the backing frame to further position the closed face frame on the backing frame.

17. The wall mountable mirror of claim 15, wherein the face frame is lockable in a closed position for use.

18. The wall mountable mirror of claim 17, wherein the face frame is lockable to the backing frame by a sliding lock comprising a sliding bar, guides, and catches, the catches cooperate with angles attached to the horizontal top edge of the backing frame to hold the face frame in the closed position.

* * * * *